M. MUNZNER.
SCALE FOR DETERMINING SPECIFIC GRAVITIES.
APPLICATION FILED DEC. 20, 1915.
1,229,641.
Patented June 12, 1917.
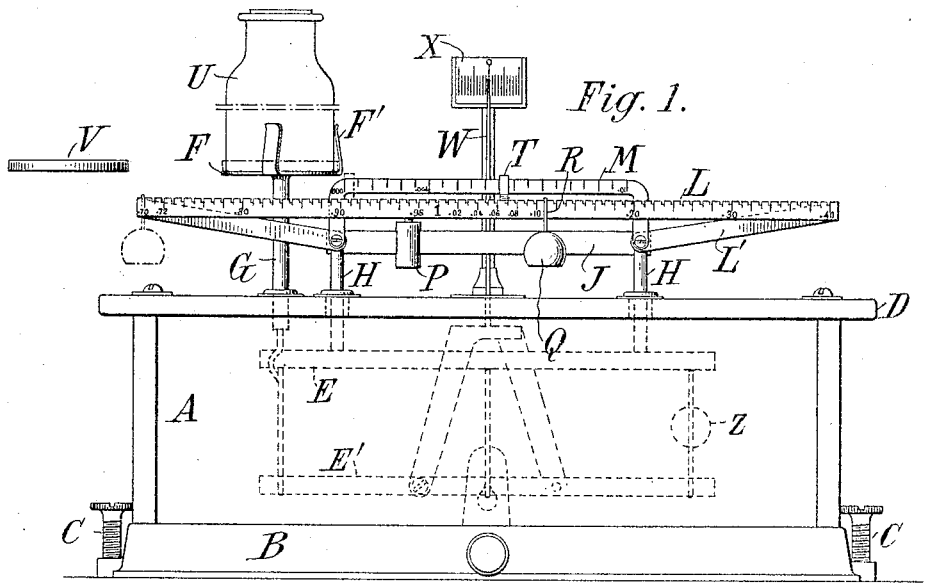
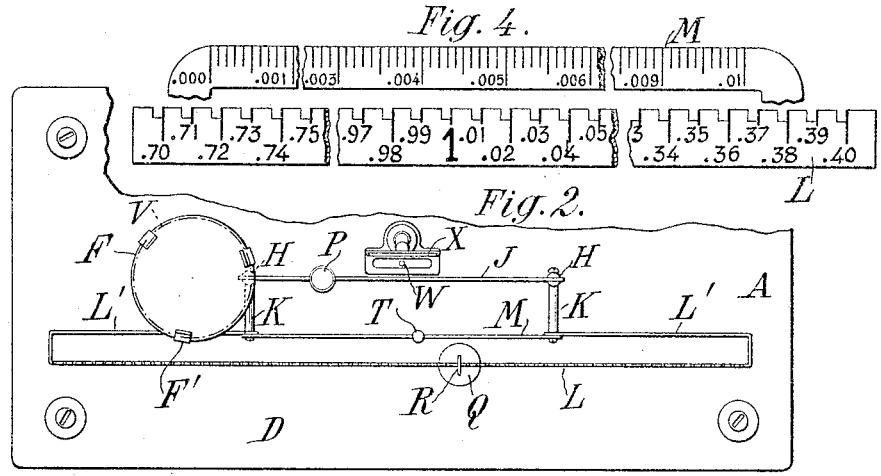
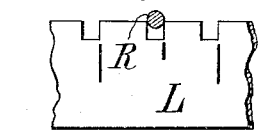
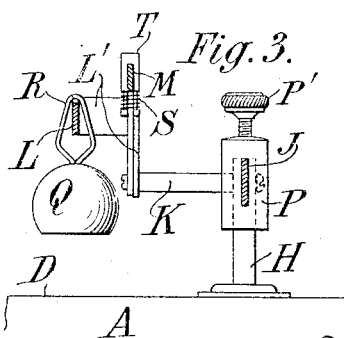
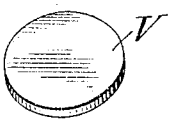
WITNESSES:
René Bruine
Fred White
INVENTOR:
Max Munzner,
By Attorneys,
Fraser, Dirk & Myers

UNITED STATES PATENT OFFICE.

MAX MUNZNER, OF ARLINGTON, NEW JERSEY, ASSIGNOR TO THE TORSION BALANCE COMPANY, OF NEW YORK, N. Y., A CORPORATION OF NEW YORK.

SCALE FOR DETERMINING SPECIFIC GRAVITIES.

1,229,641. Specification of Letters Patent. Patented June 12, 1917.

Application filed December 20, 1915. Serial No. 67,794.

*To all whom it may concern:*

Be it known that I, MAX MUNZNER, a citizen of the United States of America, residing in Arlington, in the county of Hudson and State of New Jersey, have invented certain new and useful Improvements in Scales for Determining Specific Gravities, of which the following is a specification.

This invention provides a scale designed and adapted for weighing a measured volume of liquid or solid, and determining by direct reading the specific gravity thereof.

Various attempts have been made to provide scales for facilitating the determination of specific gravities, but these have involved in use more or less computation, none of them having been adapted for indicating the specific gravity by a direct reading.

The present invention provides a scale which is so constructed that it may be balanced before applying the substance to be weighed and its container; which, after the application of the container, may weigh off the tare of the latter; which is adapted to eliminate weights beneath the minimum specific gravity which is required in practice to be determined; and which, upon filling the container with the measured quantity of a liquid or other material the specific gravity of which is to be determined, is adapted for weighing this off to extreme nicety and thereby indicating by direct reading its precise specific gravity for the standard or normal temperature for which the scale is graduated.

In the accompanying drawings this scale is shown as applied to a torsion balance of the well-known construction, but it is applicable to other balances or scales of different types.

Figure 1 of the accompanying drawings is a front elevation of the scale;

Fig. 2 is a plan thereof;

Fig. 3 is a fragmentary transverse section on a larger scale;

Fig. 4 is a fragmentary portion of Fig. 1 showing the graduated beams or bars drawn to a larger scale;

Fig. 5 shows on a still larger scale a fragment of the main graduated beam;

Fig. 6 is a perspective view of a counterweight disk.

Referring to Figs. 1, 2 and 3, A designates the inclosing base or casing of any suitable construction of balance, being in the case shown the well-known torsion balance. The casing A has the usual base B and leveling screws C, C, and the usual perforated top D.

In the case of a torsion balance (and preferably with any other form) two parallel balance beams E E' are employed which, being inclosed within the casing A, are shown in dotted lines. These are hung at their middles upon torsion wires or knife edges, and are connected at their ends by torsion trusses or otherwise in the usual manner. The scale pan F is mounted, as usual, on a post G which is supported on one of the trusses connecting the two beams, whereby it is held vertical. From the upper beam E project rigidly two posts H H which pass up freely through holes in the top plate B and support the upper graduated beams of the scale. These beams may be variously arranged, but in the construction shown the horizontal member J connects the two posts H H, and from the posts project two horizontal bars K K, to the front ends of which are fastened members L and M. The member L is preferably of the maximum length which may conveniently be used with a given size of casing A, and for this reason its ends project beyond the posts H H and bars K K, being connected with the latter by rearwardly and inwardly bent portions L' L'. The member L is selected to receive the coarser specific gravity gradations, and the member M the finer of fractional gradations, as best shown in Fig. 4 wherein the extreme end portions and the middle portion of the respective members, with their markings or graduations, are illustrated.

The member J is the tare beam, being traversed by an adjustable tare weight or slider P which may be fastened in place by a set screw P'.

The main beam or member L is traversed by a counterweight Q which may be hung from any one of the successive notches formed in the top of the member. This construction affords much more delicate weighing than by the use of a slide-weight, since the hanging weight falls with its center of gravity directly beneath the center of the notch in which its hanger lies. It is highly desirable in practice to make this counterweight as a dead-beat weight, that is to say, that it shall quickly find its position without any prolonged or repeated swinging movements. For this purpose it is hung by a loop or hanger R which passes over the top of the member L and at this point is of rounded cross section, as best shown at Fig. 5, so that it partly enters into any one of the notches, its opposite sides engaging the opposite sides or corners of the notches at such angle as to generate a considerable degree of friction, whereby the counterweight is prevented from swinging and is quickly brought to rest.

For the fractional beam or member M, which, for convenience, is extended upward above the beam L, as shown, the counterweight is best formed as a slider T on the lower part of which is coiled a spring S, Fig. 3, which, pressing lightly upward against the underside of the member M, generates sufficient friction to keep the light slider from moving, except when pushed along by the operator.

U is the container or receptacle for receiving the liquid or other material to be weighed. It is constructed in any of the known or approved ways whereby it shall receive precisely a given volume of liquid (for example, 100 cubic cm.) at the standard temperature selected, (usually 15° C.). The container U is shown as in the form of a bottle, and in order to hold it in place on the scale pan F the latter is formed with three upturned elastic fingers F' which yieldingly embrace the bottle.

The weight of this container is counterbalanced by displacing the tare weight P from its left-hand or zero position toward the right. For this purpose the member J does not require to be graduated.

In practice it is not required to weigh liquids (or solids) below some well defined minimum specific gravity, nor those above a determined maximum specific gravity. Between these limits it is desirable that the scale beam or member L shall be graduated. As the practical limit of length of this member is approximately that of the length of the casing A or its top D (in order that the graduated beam shall not project beyond the casing and thereby be liable to injury), and as it is desirable that the entire length of the beam shall be utilized and that the graduations shall be as coarse as possible, it is desirable to provide the scale with means for eliminating weights of materials below the minimum for which the scale is designed. With the particular scale shown the minimum specific gravity for which it is adapted is .70 and the maximum is 1.40 (see Fig. 4). Taking this example, it is necessary to provide some means for bridging the gap between zero weight and the weight of the prescribed volume of material, if of specific gravity .70. To accomplish this the scale has built into it or permanently attached to one of its balance beams, a prescribed dead weight (indicated in dotted lines at Z in Fig. 1). To counterbalance this dead weight there is provided a fixed weight or slug V, shown in Fig. 1 and also in Fig. 6. The weight of this slug exactly corresponds to the prescribed volume (100 c. c.) of a liquid of the assumed minimum specific gravity .70 (and, of course, at the standard temperature). By placing this slug on the scale pan F without the container U, and by moving each of the counterweights or sliders P, Q, T, to their extreme left-hand positions, the scale should precisely balance. This is indicated by the usual pointer W attached in the ordinary manner to one of the balance beams E or E', and the end of which should point to zero on the graduated tablet X. If this pointer does not come to zero, either the scale is out of adjustment or the support on which it rests is not level; either condition can ordinarily be corrected by the adjusting screws C C.

In operation, the scale is first tested or brought to adjustment in the manner just described, that is, by placing the slug V on the pan, but without the container U. The condition then is that of the measured or standard quantity of the material of minimum specific gravity which is precisely balanced by the weight Q when hanging at the point .70. Then the bottle or container U, being empty, is placed on the pan (in addition to the slug) and the tare weight P is moved to the right until it exactly balances the container, whereupon it is fastened in such position by its set screw. The container is then removed and filled with the exact volume of liquid to be weighed (usually 100 c. c.). The slug V is then removed from the scale pan and the container with its liquid placed on the pan. If the liquid is of precisely the minimum specific gravity .70, the scale should precisely balance under these conditions. Usually, however, the liquid will be of greater specific gravity, whereupon the operator must move the weight Q to the right until the scale is brought to substantial balance. As this weight is to hang from one of the notches of the beam or member L, it will rarely happen that the weight will precisely correspond to one of two successive notches, being usually represented by a position of the counterweight Q somewhere between the centers of two such notches. In such case the counterweight Q is to be hung from the notch of the lower value so as to slightly underpoise the scale; whereupon the operator will move the slider T on the fractional beam member M to the right until the scale is brought to precise balance.

With the proportions shown the entire range of the beam member M corresponds in weight to the range from one notch to the next of the member L.

Consequently, to read the result it is only necessary to take the first two figures to the right of the decimal point from the main member L and read the third figure from the member M, adding thereto, if need be, a fourth figure taken from the graduating marks on the latter member, according to the position of the left-hand edge of the slider T.

Take, for example, a liquid of specific gravity 1.0365; the position of weight Q will directly indicate on the member L the numbers 1.03, and the position of slider T on member M will indicate .0065. As to the latter, the figures .00 are blanks corresponding to the decimal readable from the main member L. These are disregarded and the operator simply fills out the fraction to its third and fourth terms by adding the figures 5, 6.

From the foregoing description it will be perceived that this scale affords an ideally simple, convenient and rapid means for determining specific gravities by direct weighing.

The invention is not limited to the precise construction and arrangements shown, being susceptible of a reasonable degree of variation or modification, as will be apparent to those skilled in the art. For example, the invention is not limited to the use of the ordinary parallel balance beams, nor to the construction of the graduated members as separate elements from a balance beam or beams; nor to the mounting of the scale pan on a movable standard above the balance beam or beams; these being common features of construction which are resorted to for convenience.

In some cases it is desirable to slightly modify the proportions of the scale, particularly when the vessel U is somewhat heavy. In such case the permanent counterweight Z more than compensates for the weight of the substance of minimum specific gravity and includes also more or less of the tare weight. It may include the entire average tare weight. In any such case the weight P may be made much smaller and lighter than if it had to counterpoise the entire tare. The weight P is adjustable preferably to both sides of the center, so that if the permanent weight Z overweights the tare, the weight P may have the negative effect of reducing to the precise tare weight necessary. Other modifications of proportion will be obvious to those skilled in this art.

I claim as my invention:—

1. A specific gravity scale comprising a balance beam, a scale pan hung thereon adapted to receive a prescribed volume of the material to be weighed, and counterbalancing means applied to said beam to balance the weight of the material of minimum specific gravity to be weighed, said beam having a beam member having successive notches and graduated at said notches to successive specific gravity readings commencing with said minimum, and a fractional beam member having a range of graduations corresponding on a larger scale to the range between successive readings of said first-named member, a counterbalance weight adapted to hang from the successive notches of said notched beam member, and a counterbalance weight adjustable along said fractional beam member.

2. A specific gravity scale comprising a balance beam, a scale pan supported thereby, a permanent weight applied to said balance beam to counterbalance a material of the minimum specific gravity to be weighed, a beam member graduated in specific gravity readings commencing with said minimum, and counterbalancing means adapted to counterpoise said permanent weight and thereby to balance the scale in the absence of any material being weighed.

3. A specific gravity scale comprising a balance beam, a scale pan supported thereby, a permanent weight applied to said balance beam to counterbalance a material of the minimum specific gravity to be weighed, a beam member graduated in specific gravity readings commencing with said minimum, and a slug adapted, when applied, to balance the scale in the absence of any material being weighed, the weight of said slug corresponding to that of the prescribed volume of said material of minimum specific gravity.

4. A scale comprising a balance beam, a scale pan supported thereby, a container adapted to hold a prescribed volume of material to be weighed, a permanent weight adapted to counterbalance said material if of minimum specific gravity, a counterweight or slug adapted, when applied, to counterbalance said permanent weight when such material is absent, and a tare weight movable to counterbalance said container when empty.

5. In a scale, a graduated beam member and a suspended counterweight hung therefrom with two opposite points of contact to form a frictional engagement adapted to suppress swinging movements of the counterweight.

6. In a scale, a graduated beam member having successive serrations and a counterweight having a hanger whereby it is hung from said member, said hanger adapted to engage any of said serrations, and the hanger and serrations having each two opposite points of reciprocal frictional engagement adapted to suppress swinging movements of the counterweight.

7. In a scale, a graduated beam member having angular notches in its upper side and a counterweight having a hanger whereby it is hung from said member, said hanger adapted to enter partially into said notches and engaging the edges thereof angularly whereby to permit the counterpoise to hang from a notch while generating friction sufficient to suppress swinging movements of the counterweight.

In witness whereof, I have hereunto signed my name in the presence of two subscribing witnesses.

MAX MUNZNER.

Witnesses:
F. MORRELL MIDDLESWORTH,
ROBT. A. SCHAELET.

Copies of this patent may be obtained for five cents each, by addressing the "Commissioner of Patents, Washington, D. C."